(12) United States Patent
Tsukagoshi

(10) Patent No.: US 8,905,556 B2
(45) Date of Patent: Dec. 9, 2014

(54) PROJECTOR HAVING CONTROL UNIT THAT CONTROLS LENS SHIFT DURING ZOOM BY LENS DRIVING UNIT AND CONTROL METHOD THEREOF

(75) Inventor: Shinichi Tsukagoshi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 393 days.

(21) Appl. No.: 13/316,699

(22) Filed: Dec. 12, 2011

(65) Prior Publication Data
US 2012/0147341 A1 Jun. 14, 2012

(30) Foreign Application Priority Data

Dec. 14, 2010 (JP) ................................. 2010-277767

(51) Int. Cl.
G03B 21/14 (2006.01)
H04N 9/31 (2006.01)

(52) U.S. Cl.
CPC .............. *H04N 9/317* (2013.01); *G03B 21/142* (2013.01); *G03B 2205/0053* (2013.01); *G03B 21/147* (2013.01); *H04N 9/3194* (2013.01); *G03B 2205/0046* (2013.01)
USPC .............................. 353/101; 353/70; 359/694

(58) Field of Classification Search
CPC .... G03B 21/14; G03B 21/142; G03B 21/147; G03B 21/53; G03B 2205/0046; G03B 2205/0053; G02B 7/04; G02B 7/09; G02B 7/10; G02B 7/102; G02B 7/105; G02B 7/28; G02B 7/282; H04N 9/317; H04N 9/3194
USPC ............. 353/70, 100–101; 359/676, 694, 697
See application file for complete search history.

(56) References Cited

U.S. PATENT DOCUMENTS

| | | | | |
|---|---|---|---|---|
| 6,592,228 | B1 * | 7/2003 | Kawashima et al. | 353/101 |
| 6,886,946 | B2 * | 5/2005 | Eguchi | 353/101 |
| 7,401,929 | B2 | 7/2008 | Matsumoto et al. | |
| 7,524,067 | B2 * | 4/2009 | Sato | 353/42 |
| 7,609,458 | B2 * | 10/2009 | Inoue | 359/691 |
| 8,159,760 | B2 * | 4/2012 | Kubota | 359/697 |
| 8,393,740 | B2 * | 3/2013 | Sajadi et al. | 353/70 |
| 8,411,211 | B2 * | 4/2013 | Akeyama | 348/747 |
| 2005/0018144 | A1 * | 1/2005 | Wada et al. | 353/69 |
| 2006/0038962 | A1 * | 2/2006 | Matsumoto et al. | 353/69 |
| 2010/0123878 | A1 * | 5/2010 | Furui | 353/70 |
| 2012/0050701 | A1 | 3/2012 | Wang | |

FOREIGN PATENT DOCUMENTS

| | | |
|---|---|---|
| CN | 102375316 A | 3/2012 |
| JP | 2006-005534 A | 1/2006 |
| JP | 2010-020036 A | 1/2010 |

* cited by examiner

*Primary Examiner* — Tony Ko
*Assistant Examiner* — Jori S Reilly-Diakun
(74) *Attorney, Agent, or Firm* — ALG Intellectual Property, LLC

(57) ABSTRACT

A projector includes a lens driving unit that drives a lens unit including a projection lens; a reception unit that receives instruction information that is input; and a control unit that controls a lens shift by the lens driving unit based on lens shift instruction information with respect to the projection lens, which is received by the reception unit, in such a manner that zoom, which is performed by the lens driving unit based on zoom instruction information adjusting angle of view with respect to the projection lens, is performed in a predetermined state for a first image which is projecting in a state that a central position of the first image is different from a basis position of the zoom.

14 Claims, 8 Drawing Sheets

PROJECTOR HAVING CONTROL UNIT THAT CONTROLS LENS SHIFT DURING ZOOM BY LENS DRIVING UNIT AND CONTROL METHOD THEREOF

The entire disclosure of Japanese Patent Application No. 2010-277767, filed Dec. 14, 2010 is expressly incorporated by reference herein.

BACKGROUND

1. Technical Field

The present invention relates to a projector, and a control method thereof.

2. Related Art

For example, as described in JP-A-2006-5534, there is provided a projector having a zoom function and a lens shift function with respect to a projection lens.

In a situation in which a projector projects an image, when a zoom state is changed in a state where a lens shift is not performed, the size of an image is changed on the basis of the central position of the image. In contrast, when the zoom state is changed in a state where the lens shift is performed, a size of the image is changed on the basis of a position that is not the central position of the image. In this way, in a general projector, there is a difference in a variation of a zoom state depending on a state of whether or not a lens shift is performed. That is, in case that the central position of the image is different from the basis position of the zoom which adjusts the angle of view of the projector, there is a difference in a variation of a zoom state of the image compared with the case that the central position of the image matches the basis position of the zoom.

For example, in a case where a user performs the lens shift to avoid an obstacle, an image is magnified in all direction by a zoom indication, and therefore a part of the image overlaps with the obstacle. Therefore, there is a problem in that the lens shift has to be performed again.

SUMMARY

An advantage of some aspects of the invention is to solve at least part of the problems described above and the invention can be implemented as the following forms or aspects.

According to an aspect of the invention, there is provided a projector that projects an image based on image data including a lens driving unit that drives a lens unit including a projection lens; a reception unit that receives instruction information that is input; and a control unit that controls a lens shift by the lens driving unit based on lens shift instruction information with respect to the projection lens, which is received by the reception unit, in such a manner that zoom, which is performed by the lens driving unit based on zoom instruction information adjusting angle of view with respect to the projection lens, is performed in a predetermined state for a first image which is projecting in a state that a central position of the first image is different from a basis position of the zoom.

According to the aspect of the invention, in a case where a zoom instruction is made in a state where the central position of the image is different from the basis position of the zoom, the projector can adjust a position of the image by performing a lens shift control, such that it is possible to project an appropriate image.

In the projector, even in a case where a zoom instruction is made in a state where the central position of the image is different from the basis position of the zoom, the image may be projected in a state where the central position of the image is not changed, such that it is possible to project an appropriate image.

In the projector, even in a case where a zoom instruction is made in a state where the lens shift is performed, the image may be projected in a state where a position of the image is not changed at a base end side for a direction of the lens shift, such that it is possible to project an appropriate image.

In the projector, even in a case where a zoom instruction is made in a state where the central position of the image is different from the basis position of the zoom, the image may be projected in a state where a position of one side or two sides of the image is not changed before and after the adjustment of the angle of view, such that it is possible to project an appropriate image.

In the projector, the image may be projected according to a setting of a desired state, such that it is possible to project an appropriate image.

In the projector, even in a case where a zoom instruction is made in a state where the central position of the image is different from the basis position of the zoom, the image may be projected in a state where a position of a reference side of the image is not changed, such that it is possible to project an appropriate image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments in which the invention is applied to a projector will be described with reference to the accompanying drawings. In addition, the following embodiments do not restrict the contents of the invention described in the appended claims. In addition, all of the configurations shown in the following embodiments are not necessarily requisite as solving means of the invention described in the appended claims.

First Embodiment

Figure 1:
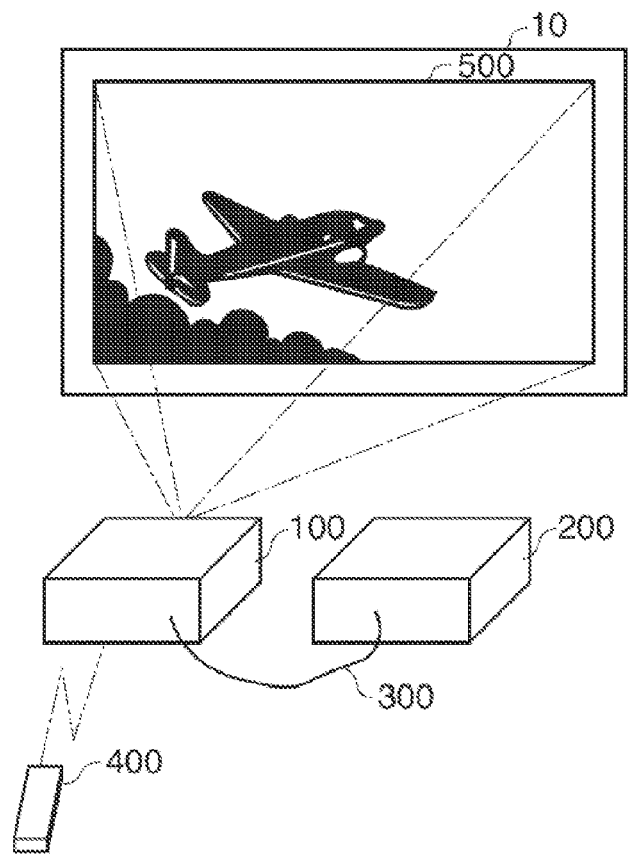
FIG. 1 is a diagram illustrating a projection situation according to a first embodiment.

FIG. 1 shows a diagram illustrating a projection situation according to a first embodiment. An image signal is input from a DVD player 200 through an HDMI cable 300 to a projector 100, and the projector 100 projects an image 500 onto a screen 10 based on the image signal. A user operates a remote controller 400 to adjust the size, position, or the like of the image 500. The projector 100 performs this adjustment by adjusting a position of a lens unit (for example, a lens-barrel, a zoom lens, or the like) having a projection lens.

Figure 2:
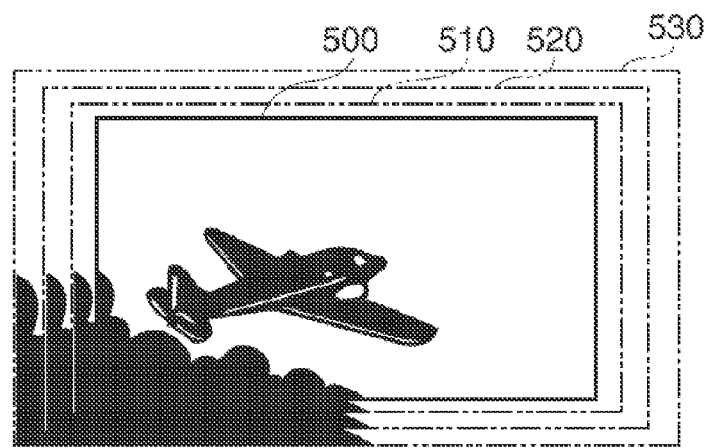
FIG. 2 is a diagram illustrating a change in an image by a zoom operation in a state where a lens shift is not performed.

FIG. 2 shows a diagram illustrating a change in the image 500 by a zoom operation in a state where a lens shift is not performed. For example, a user magnifies and projects the image 500, for example, as images 510, 520, and 530 by the projector 100 through a zoom operation using the remote controller 400 in a state where the lens shift is not performed. In this case, the central position of the image 500 and the central position of each of the images 510, 520, and 530 coincide with each other.

Figure 3:
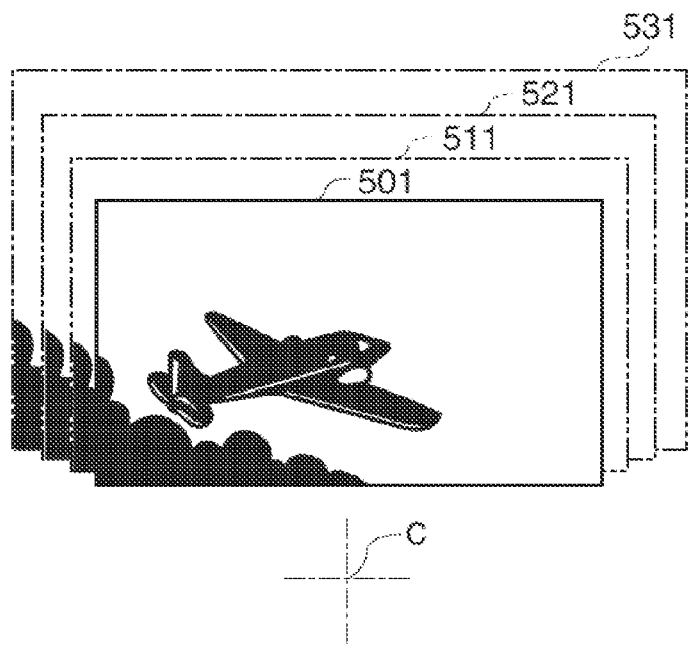
FIG. 3 is a diagram illustrating a change in an image by a zoom operation in a state where a lens shift is performed in the related art.

FIG. 3 shows a diagram illustrating a change in an image 501 by a zoom operation in a state where a lens shift is performed in a related art. For example, when a user performs the zoom operation in a state where a lens shift is performed upward with respect to a central position C of an image in a state where the lens shift is not performed, in the projector of the related art, the image 501 before the zoom is magnified and projected, for example, as images 511, 521, and 531. In this case, the projector of the related art magnifies the image 501 with the central position C made as a reference, such that the central position of the image 501 and the central position of each of the images 511, 521, 531 do not coincide with each other. In this way, in the projector of the related art, the behavior of the image 500 and 501 during the zoom operation becomes different depending on whether or not the lens shift is performed.

Figure 4:
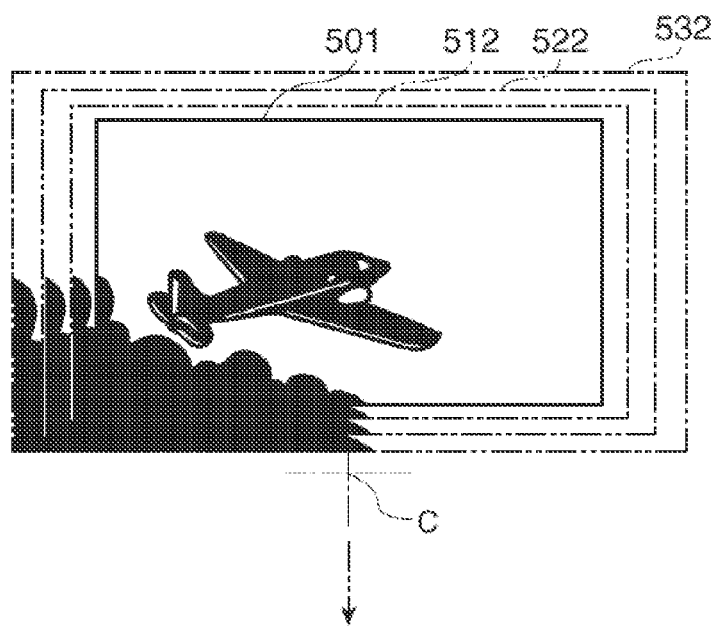
FIG. 4 is a diagram illustrating a change in an image by a zoom operation in a state where a lens shift is performed according to the first embodiment.

FIG. 4 shows a diagram illustrating a change in the image 501 by the zoom operation in a state where the lens shift is performed according to the first embodiment. The projector 100 according to this embodiment has a function of performing a zoom operation on the image 501 in such a manner that the central position of the image 501 is not changed according to a present lens shift state, in a case where a zoom instruction is made relating to the image 501. In this manner, the image 501 coincides with images 512, 522, and 532 in a central position thereof. Next, a functional block of the projector 100 having this function will be described.

Figure 5:
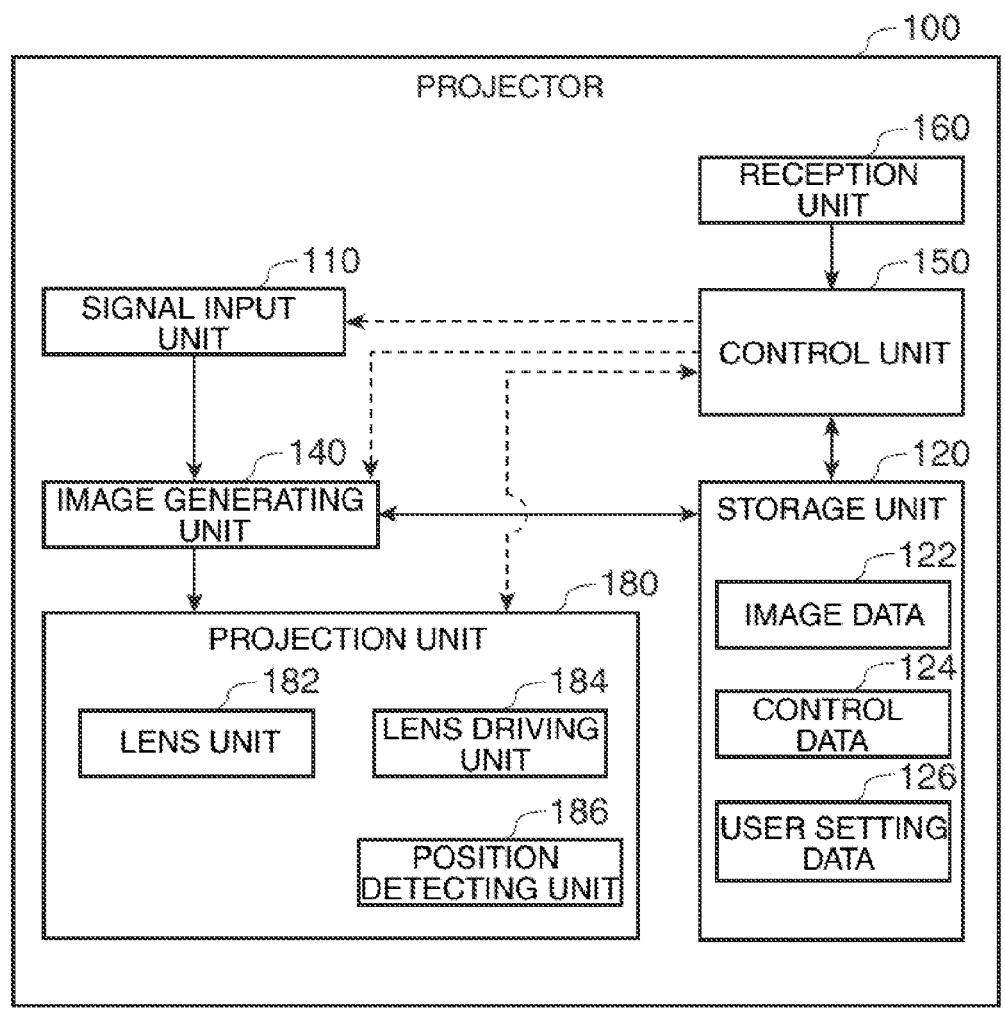
FIG. 5 is a functional block diagram of a projector according to the first embodiment.

FIG. 5 shows a functional block diagram of a projector 100 according to the first embodiment. The projector 100 includes a signal input unit 110 to which an image signal from the DVD player 200, or the like is input, a storage unit 120, an image generating unit 140, a reception unit 160 that receives instruction information from the remote controller 400, a control unit 150 that controls the image generating unit 140 or the like, and a projection unit 180. The storage unit 120 stores image data 122, control data 124, a user setting data 126, or the like. In addition, the projection unit 180 includes a lens unit 182, a lens driving unit 184 that drives the lens unit 182, and a position detecting unit 186 that detects a position of the lens unit 182 or the like.

Figure 6:
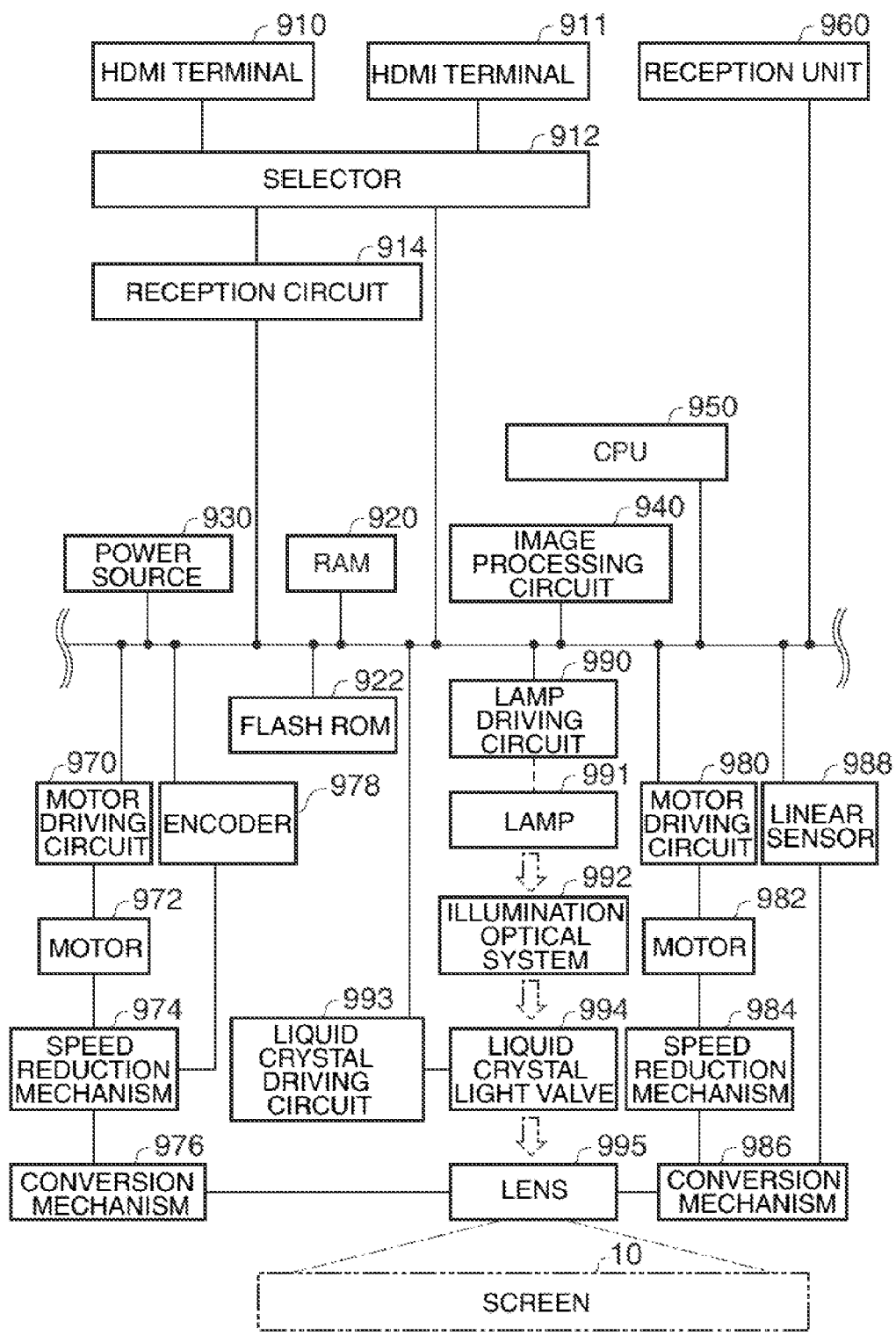
FIG. 6 is a hardware block diagram of the projector according to the first embodiment.

FIG. 6 shows a hardware block diagram of the projector 100 according to the first embodiment. For example, the signal input unit 110 may include HDMI terminals 910 and 911, a selector 912, a reception circuit 914, or the like, the storage unit 120 may include a RAM 920, a flash ROM 922, or the like, the image generating unit 140 may include an image processing circuit 940 or the like, the control unit 150 may include a CPU 950 or the like, the reception unit 160 may include a reception unit 960 or the like, and the projection unit 180 may include a lamp driving circuit 990, a lamp 991, an illumination optical system 992, a liquid crystal driving circuit 993, a liquid crystal light valve 994, a lens 995, or the like. In addition, the projector 100 also includes a power source 930 or the like. In addition, actually, the lens 995 includes a plurality of lenses including a zoom lens, a focus lens, a projection lens, or the like.

In addition, the lens driving unit 184 that performs an zoom adjustment or the like may include a motor 972, a motor driving circuit 970 that drives the motor 972, a speed reduction mechanism 974 that adjusts a rotational speed of the motor 972, a conversion mechanism 976 that converts a rotary motion of the motor 972 into a linear motion, or the like. The position detecting unit 186 may include an encoder 978 or the like that is connected to the speed reduction mechanism 974 and acquires position information of the lens 995 (zoom lens) through the speed reduction mechanism 974. In addition, the lens driving unit 184 that performs the lens shift may include a motor driving circuit 980, a motor 982, a speed reduction mechanism 984, a conversion mechanism 986, or the like. The position detecting unit 186 may include a linear sensor 988 or the like that is connected to the conversion mechanism 986 and acquires position information of the lens 995 (projection lens) through the conversion mechanism 986. As described above, the projector 100 has a hardware configuration in order to electrically perform a zoom, a lens shift, or the like.

Figure 7:
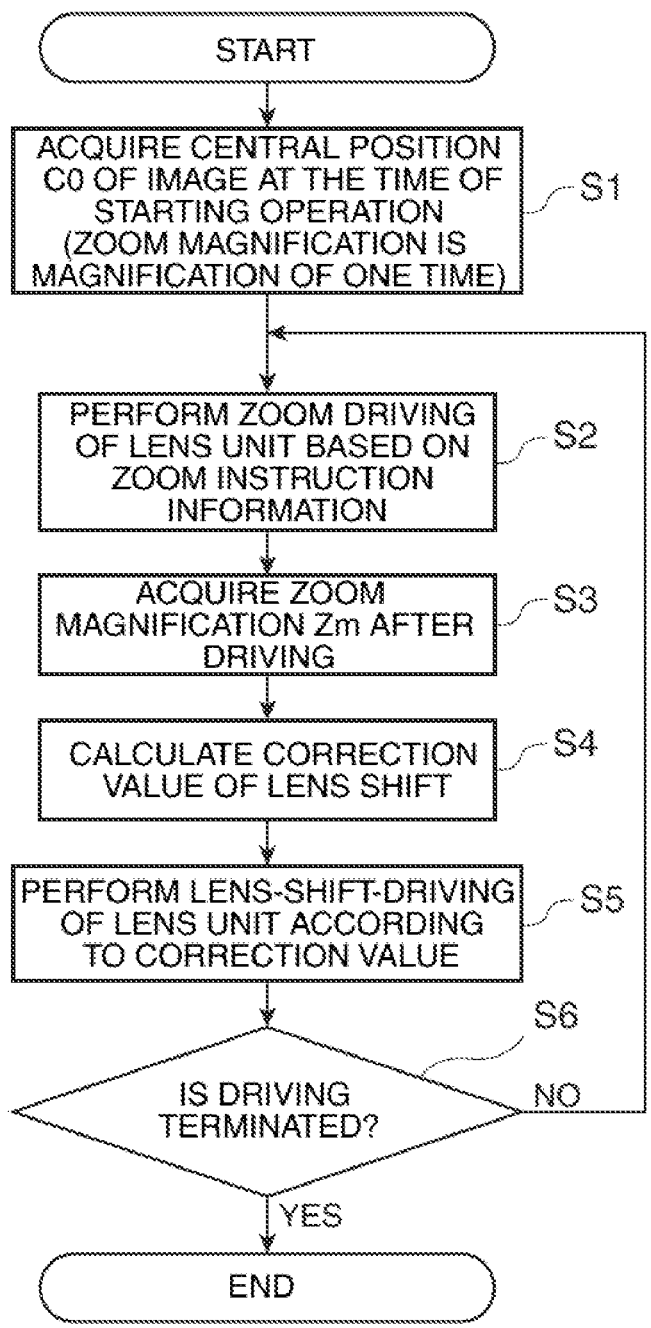
FIG. 7 is a flowchart illustrating an example of a lens control sequence according to the first embodiment.
Figure 8:
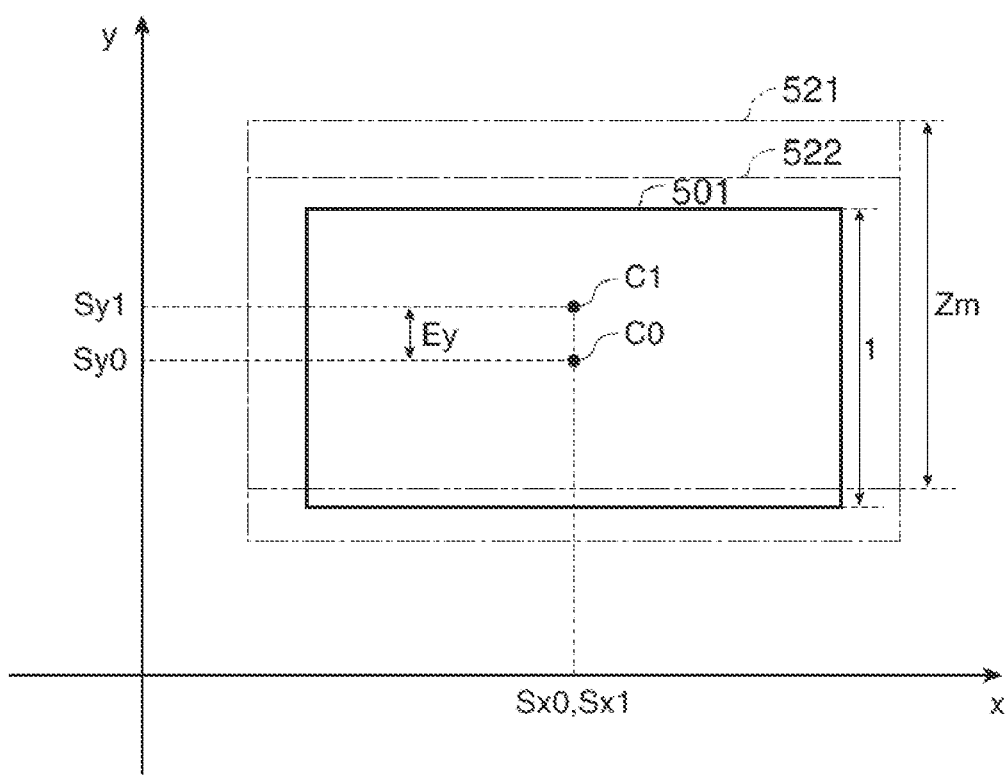
FIG. 8 is a diagram illustrating an example of a coordinate serving as a reference according to the first embodiment.

Next, a lens control sequence using each unit during a zoom operation in a state where the lens shift is performed will be described. FIG. 7 shows a flowchart illustrating an example of a lens control sequence according to the first embodiment. Here, the description will be made with reference to a motion when a zoom magnification starts at magnification of one time and is changed to magnification of Zm times. In addition, FIG. 8 shows a diagram illustrating an example of a coordinate serving as a reference according to the first embodiment. The reception unit 160 receives lens shift instruction information with respect to the projection lens from the remote controller 400, and the control unit 150 controls the lens driving unit 184 in order for the lens shift to be performed based on the lens shift instruction information. In this manner, the lens shift is performed. In addition, the reception unit 160 receives zoom instruction information that is an angle of view adjustment instruction with respect to the projection lens from the remote controller 400, and the control unit 150 controls the lens driving unit 184 in order for the zoom to be performed based on this zoom instruction information. In this manner, the zoom is performed. In addition, the control unit 150 may store a present lens shift or a present zoom state in the storage unit 120 as a part of the user setting data 126 based on the lens shift instruction information or the zoom instruction information, or may store the present lens shift or the present zoom state in the storage unit 120 as a part of the user setting data 126 based on information from the position detecting unit 186.

First, the control unit 150 acquires a central position C0 (Sx0, Sy0) of the image 501 (first image) when a zoom magnification is magnification of one time at the time of starting an operation (step S1). In addition, this position information coincides with position information of the lens shift, such that the control unit 150 uses the position information acquired from the position detecting unit 186 as position information of the central position C0 of the image as it is. In the case of FIG. 8, the image 501 is moved by the lens shift, and when the zoom magnification is changed from magnification of one time to magnification of Zm times (Zm>1), an image 521 (second image) is projected. Here, the central position C0 corresponds to a first central position.

The control unit 150 controls the lens driving unit 184 to perform a zoom driving of the lens unit 182 based on the zoom instruction information received by the reception unit 160, and the lens driving unit 184 performs a zoom driving of the lens unit 182 according to this control (step S2). In addition, the control unit 150 acquires information indicating a zoom magnification Zm after the driving (after the movement of the lens unit 182) from the position detecting unit 186 (step S3). The central positions C1 (Sx1, Sy1) and C0 (Sx0, Sy0) of the image, and Zm satisfy relationships of Sx1=Zm×Sx0, and Sy1=Zm×Sy0. Here, the central position C1 corresponds to a second central position.

The control unit 150 computes correction driving amounts Ex and Ey based on this information in such a manner that the central position C0 of the image 501 at magnification of one time in a state where the lens shift is performed and the central position C1 of the image after the zoom coincide with each other (step S4). More specifically, the control unit 150 makes C0 and C1 coincide with each other by adding a correction value Ex in the horizontal direction and a correction value Ey in the vertical direction with respect to Sx1 and Sy1. That is, the computation may be performed using computation expressions of Sx0=Zm×Sx0+Ex, and Sy0=Zm×Sy0+Ey. In addition, the above-described computation expressions may be stored in the storage unit 120 as a part of the control data 124, and the control unit 150 may perform the control with reference to the control data 124. In addition, the control unit 150 controls the lens driving unit 184 in order to perform a lens-shift-driving of the lens unit 182 according to the correction value, and the lens driving unit 184 performs a lens-shift-driving of the lens unit 182 according to this control (step S5).

The control unit 150 determines whether or not the driving (driving instruction) with respect to the lens unit 182 is terminated (step S6), and in a case where it is determined that it is not terminated, performs this control (steps S2 to S5), and terminates this control in a case where it is determined that it is terminated.

As described above, according to this embodiment, in a case where the zoom instruction is made in a state where the lens shift is performed, the projector 100 performs the lens shift control, and performs a projection while the central position of each of the images 501, 512, 522, and 532 is not changed, such that it is possible to project appropriate images 512, 522, and 532.

In addition, according to this embodiment, in a state where the lens shift is performed with respect to an image having an aspect ratio of 16:9, even in a case where a Cinema Scope image having an aspect ratio of 2.35:1 (may be 21:9) (commonly called a Cinema Scope image) through an image conversion is selected and zoom instruction is made, the projector 100 can project an image while the central position of the image is not changed, such that it is possible to project an image that is easily viewed by a user.

In addition, in this embodiment, a calculation method when the zoom magnification is enlarged from magnification of one time at the time of starting the driving is described as an example. However, in a case where the zoom magnification at the time of starting the driving is not magnification of one time, the zoom magnification at the time of starting the driving is set to Zm0, and the zoom magnification acquired in step S2 is set to Zm1, and then the calculation may be formed by computing a ratio of Zm=Zm1/Zm0. In addition, in FIG. 8, a case where the image is magnified by the zoom is illustrated, but in the case of reduction, the above-described computation expression may be used as it is.

Second Embodiment

In the first embodiment, the projector 100 performs a projection without changing a central position of the images 501, 512, 522, and 532. However, the zoom of the image 501 may be performed without changing a position of one side or two sides, which serves as a reference of the image 501 (more specifically, for example, a position where an extension line of a side of the image 501 intersects with a coordinate axis in plane coordinates, or the like), according to a user's selection, a predetermined reference (for example, such things as making a lower side a reference in a case where an obstacle is detected under the image 501 based on image capturing data of the image 501 that is projected onto the screen 10), or the like.

Figure 9:
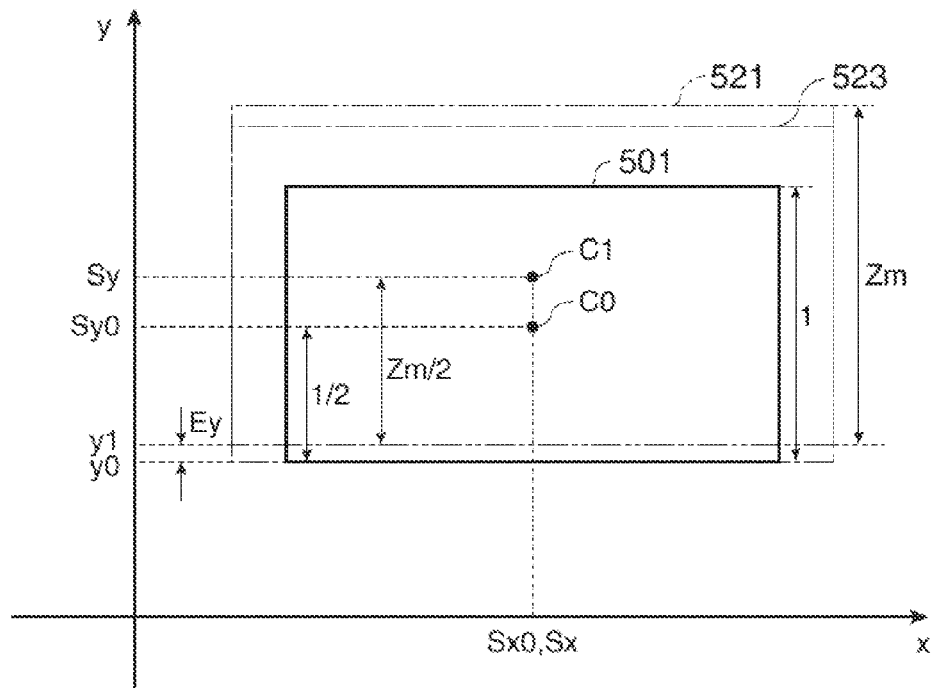
FIG. 9 is a diagram illustrating an example of a coordinate serving as a reference according to a second embodiment.

FIG. 9 shows a diagram illustrating an example of a coordinate serving as a reference according to a second embodiment. For example, when the projector 100 performs the zoom of the image 501 (first image) without changing the position of the lower side in the vertical direction, a position of the lower side of the image 501 (a position where the extension line of the lower side and an y-axis intersect with each other) satisfies a relationship of y0=Sy0−½. In addition, for a simple description, similarly to the first embodiment, it is assumed that the zoom instruction is made in a state where the image 501 in which a lens shift is performed upward in the vertical direction is projected. In addition, as shown in FIG. 9, the vertical length of the image 501 is set to "1".

When the zoom of magnification Zm is performed in this state, the position of the lower side of the image 521 (second image) after the zoom satisfies a relationship of y1=Sy−Zm/2=Zm×Sy0−Zm/2=Zm×(Sy0−½). A condition where the position of the lower side is not changed is that y0 and y1 coincide with each other. Therefore, y1=y0+correction value Ey, and the correction value Ey=y1−y0=Zm×(Sy0−½)−(Sy0−½)=(Zm−1)×(Sy0−½). In addition, this is true for a case where a thing other than the lower side is made as a reference.

As described above, according to this embodiment, the projector 100 can project the images 501 and 523 without the side serving as a reference being changed. For example, even in a case where an obstacle is present under the lower side of the image 501, the projector 100 can perform a magnification of an image, or the like without changing the position of the lower side, and thereby the image is not blocked by the obstacle even when the zoom is performed, such that convenience for a user is improved.

Third Embodiment

The projector 100 may perform lens shift control with respect to the lens driving unit 184 in such a manner that an image is projected while a position of the image (a position of a side serving as a reference) is not changed at a base end side with respect to a moving direction of the image 501 according to the lens shift instruction. For example, the control unit 150 may store the moving direction of the image 501 according to the lens shift instruction, or a present lens shift state in the storage unit 120 as a part of the user setting data 126, and may determine the base end with respect to the moving direction with reference to the user setting data 126. For example, when the moving direction is upward, the base end is a lower side, and when the moving direction faces a left side, the base end is a right side. In addition, for example, even in a case where the lens shift is performed at an upper position and then the lens shift is performed at a lower position, the control unit 150 determines whether the present lens shift state is an upward moving state or a downward moving state and determines the base end. In addition, a specific control method is the same as the second embodiment, such that the description thereof will not be repeated.

As described above, according to this embodiment, even in a case where the zoom instruction is made in a state where the lens shift is performed, the projector 100 can project an image while the position of the image is not changed at the base end side with respect to the moving direction of the image 501 according to the lens shift instruction, such that it is possible to project an appropriate image.

Fourth Embodiment

In the first to third embodiments, three kinds of control methods are described, but the projector 100 may allow a user to select through which method the control is performed (a predetermined state) among the three kinds of control methods.

Figure 10:
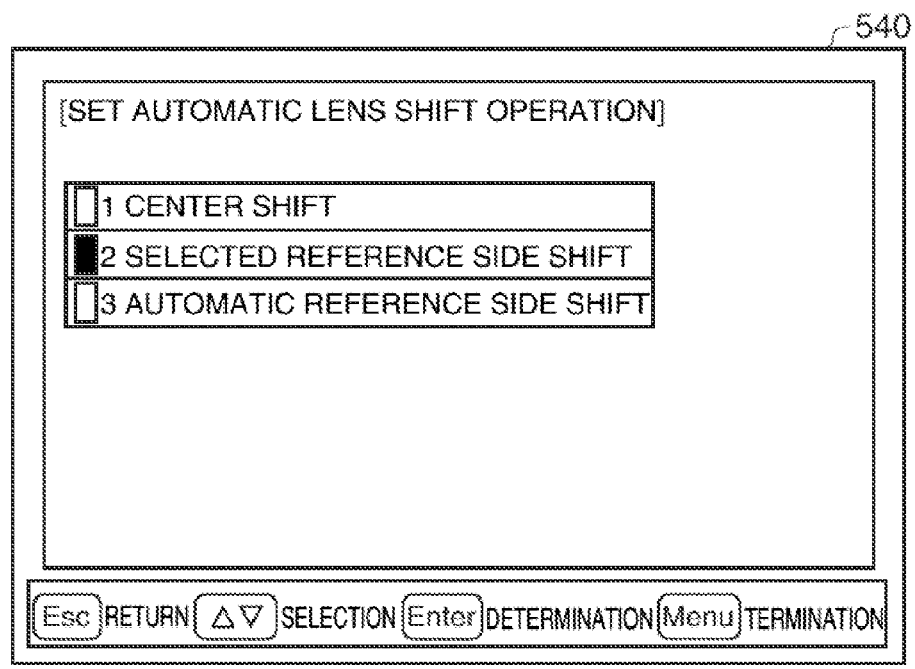
FIG. 10 is a diagram illustrating an example of a reception image according to a fourth embodiment.
Figure 11:
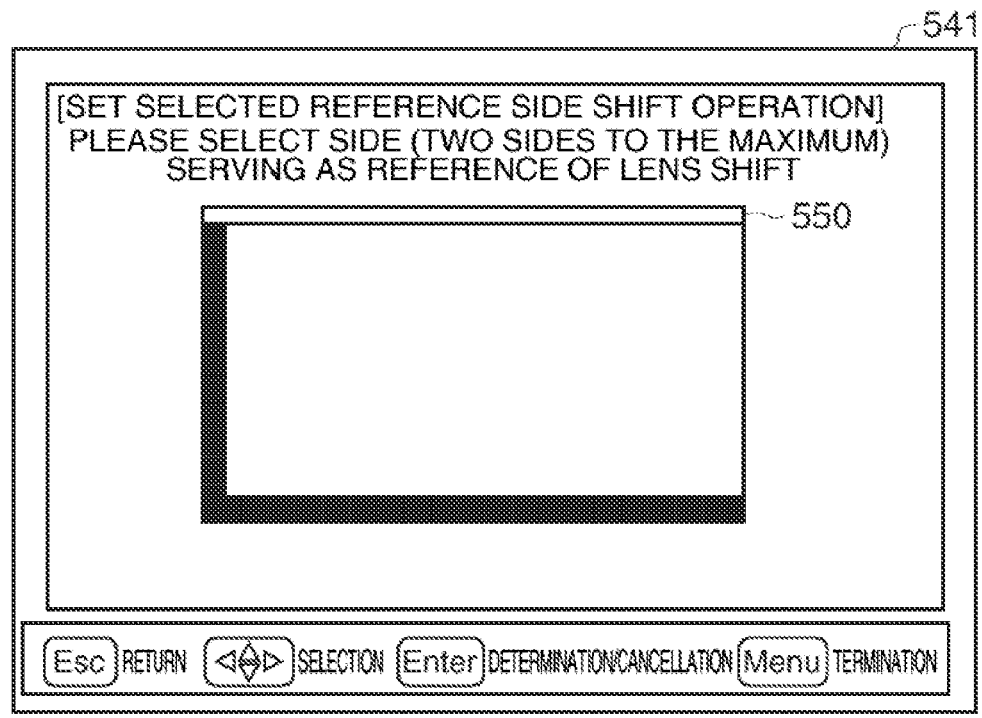
FIG. 11 is a diagram illustrating another example of the reception image according to the fourth embodiment.

FIG. 10 shows a diagram illustrating an example of a reception image 540 (a first reception screen) according to a fourth embodiment, and FIG. 11 shows a diagram illustrating another example of the reception image 541 (a second reception screen) according to the fourth embodiment. For example, in the reception image 540, three options including "center shift" corresponding to the first embodiment, "selected reference side shift" corresponding to the second embodiment, and "automatic reference side shift" corresponding to the third embodiment are displayed to be selectable. For example, when a user operates an upward key or a downward key using the remote controller 400 to select "selected reference side shift" and confirms this by pressing the Enter key, the projector 100 projects a reception image 541 that allows a selection to be made with respect to which side is made to be a reference (made not to move) among the four sides. For example, when the user presses several direction keys including an upward direction, a downward direction, a left direction, and a right direction of the remote controller 400, a cursor image 550 moves toward an instructed side, and when the user presses the Enter key of the remote controller 400, the selection or the cancellation of the selection may be performed.

For example, as shown in FIG. 11, when the Menu key (termination) of the remote controller 400 is pressed in a state where a left side and a lower side are selected, the control unit 150 stores the selected content (setting of a desired state) in the storage unit 120 as a part of the user setting data 126, and controls the lens driving unit 184 with reference to the user setting data 126 when a zoom instruction is made, in such a manner that the positions of each of the left side and the lower side are not changed.

As described above, according to this embodiment, the projector 100 can project an image according to the setting of the desired state which the user selects, such that it is possible to project the image in a desired state for the user.

Other Embodiments

In addition, an application of the invention is not limited to the above-described embodiments, and various modifications may be made. For example, a combination of the configurations of the above described embodiments may be made. For example, the control unit 150 may perform the zoom of the image in the horizontal direction of the image with the central position as a reference, and in the vertical direction of the image with the lower side as a reference. In addition, a plurality of control methods may be combined.

In addition, in the first embodiment, the control unit 150 makes a central position of the image 501 in which the magnification is magnification of one time as a reference, but the central position of the image in which the magnification is other than magnification of one time may be made to be a reference and then the calculation described above may be performed. For example, in a case where the central position of the image in which the magnification is magnification of Zn times is made to be a reference, the control unit 150 once may obtain the central position of the image in which the magnification is magnification of one time and then may perform the calculation.

In addition, a computer provided to the projector 100 may function as a control unit 150 or the like that reads out a program stored in an information storing medium. As this information storing medium, for example, a CD-ROM, a DVD-ROM, a ROM, a RAM, an HDD, or the like may be adopted.

In addition, the projector 100 is not limited to a liquid crystal projector (a transmission type, and a reflection type such as an LCOS), and may be a projector using, for example, a digital micro mirror device. In addition, the projection unit 180 may adopt a self-luminescent element having a solid-state light source such as an organic EL element, a silicon luminescent element, a laser diode, and an LED instead of a lamp. In addition, the function of the projector 100 may be distributed to a plurality of devices (for example, a PC, a projector, or the like).

What is claimed is:

1. A projector that projects an image based on image data, comprising:
    a lens driving unit that drives a lens unit, including a projection lens, to perform a lens shift to move the position of the projection lens in a direction generally parallel to the projected first image, and a zoom to increase and decrease magnification of the image;
    a position detecting unit that detects position information of the lens unit;
    a projection unit that projects a first reception image that receives a selection of a predetermined state;
    a reception unit that receives the selection of the predetermined state; and
    a control unit that controls the lens shift by the lens driving unit based on the selection of the predetermined state, which is received by the reception unit, in such a manner that zoom is performed in the predetermined state for a first image which is projecting in a state that a central position of the first image is different from a basis position of the zoom, the zoom performed by the lens driving unit based on zoom instruction information adjusting angle of view with respect to the projection lens,
    wherein
        the projection unit projects a second reception image that receives a selection of a reference side whose position is not changed in the first image by the zoom,
        the control unit controls the lens shift by the lens driving unit in such a manner that a position of the selected reference side in the first image is not changed by the zoom, and
        the reception unit that receives the selection of the reference side.

2. The projector according to claim 1, wherein the predetermined state of the zoom is that the control unit controls the lens shift by the lens driving unit in such a manner that a central position of the first image is not changed when the zoom is performed.

3. The projector according to claim 2,
wherein the control unit
acquires a first central position as the central position of the first image from position information that is detected by the position detecting unit and that corresponds to the first image,
performs the zoom of the first image,
acquires a second central position as a central position of a second image that is zoomed by the lens driving unit and a zoom magnification of the second image to the first image from position information that is detected by the position detecting unit and that corresponds to the second image,
calculates a correction value for making the first central position and the second central position coincide with each other based on the first central position, the second central position, and the zoom magnification, and
performs the lens shift for the second image based on the correction value.

4. The projector according to claim 1,
wherein in a case where the central position of the first image is different from a basis position of the zoom by performing the lens shift, and
wherein the predetermined state of the zoom is that the control unit controls the lens shift by the lens driving unit in such a manner that a position of a base end side of the first image is not changed when the zoom is performed.

5. The projector according to claim 1,
wherein the predetermined state of the zoom is that the control unit controls the lens shift by the lens driving unit in such a manner that a position of one side or two sides of the first image is not changed when the zoom is performed.

6. A method of controlling a projector that projects an image based on image data and includes a lens driving unit that drives a lens unit including a projection lens, to perform a lens shift to move the position of the projection lens, and a zoom to increase and decrease magnification of the image, comprising the steps of:
detecting position information of the lens unit,
projecting a first reception image that receives a selection of a predetermined state,
receiving the selection of the predetermined state,
controlling the lens shift by the lens driving unit based on the selection of the predetermined state, which is received, in such a manner that zoom is performed in the predetermined state for a first image which is projecting in a state that a central position of the first image is different from a basis position of the zoom, the zoom performed by the lens driving unit based on zoom instruction information adjusting angle of view with respect to the projection lens,
projecting a second reception image that receives a selection of a reference side whose position is not changed in the first image by the zoom, and
receiving the selection of the reference side,
wherein the lens shift by the lens driving unit is controlled in such a manner that a position of the selected reference side in the first image is not changed by the zoom and such that the position of the projection lens is moved in a direction generally parallel to the projected first image.

7. The method according to claim 6,
wherein the predetermined state of the zoom is that the lens shift is controlled by the lens driving unit in such a manner that the central position of the first image is not changed when the zoom is performed.

8. The method according to claim 7,
wherein the method further comprises the steps of:
acquiring a first central position as the central position of the first image from position information that is detected by the position detecting unit and that corresponds to the first image,
performing the zoom of the first image,
acquiring a second central position as the central position of a second image that is zoomed by the lens driving unit and a zoom magnification of the second image to the first image from position information that is detected by the position detecting unit and that corresponds to the second image,
calculating a correction value for making the first central position and the second central position coincide with each other based on the first central position, the second central position, and the zoom magnification, and
performing the lens shift for the second image based on the correction value.

9. The projector according to claim 1, wherein the control unit
acquires a position of the first image, in accordance with the predetermined state, as a first reference position from position information that is detected by the position detecting unit and that corresponds to the first image,
performs the zoom of the first image,
acquires a position of the second image, in accordance with the predetermined state, as a second reference position that is zoomed by the lens driving unit and a zoom magnification of the first image to the second image from position information that is detected by the position detecting unit and that corresponds to the second image,
calculates a correction value for making the first reference position and the second reference position coincide with each other based on the first reference position, the second reference position, and the zoom magnification, and
performs the lens shift for the second image based on the correction value, in accordance with the selection of the predetermined state received by the reception unit.

10. The projector according to claim 9,
wherein the control unit acquires a central position of the first image as the first reference position, and a central position of the second image as the second reference position, and
wherein the predetermined state of the zoom is that the control unit controls the lens shift by the lens driving unit in such a manner that the central position of the first image is not changed when the zoom is performed.

11. The projector according to claim 9,
wherein the control unit acquires a base end side of the first image, which is opposite the direction of the lens shift, as the first reference position, and a base end side of the second image, which is opposite the direction of the lens shift, as the second reference position, and
wherein the predetermined state of the zoom is that the control unit controls the lens shift by the lens driving unit in such a manner that the position of the base end side of the first image is not changed when the zoom is performed.

12. The projector according to claim 9,
wherein the control unit acquires one side or two sides of the first image as the first reference position, and one side or two sides of the second image, corresponding to the one side or two sides of the first image, as the second reference position, and wherein the predetermined state of the zoom is that the control unit controls the lens shift by the lens driving unit in such a manner that the position of one side or two sides of the first image is not changed when the zoom is performed.

13. The method according to claim 6, further comprising:

acquiring a position of the first image, in accordance with the predetermined state, as a first reference position from position information that is detected and that corresponds to the first image, performing the zoom of the first image, acquiring a position of the second image, in accordance with the predetermined state, as a second reference position that is zoomed by the lens driving unit and a zoom magnification of the first image to the second image from position information that is detected and that corresponds to the second image, calculating a correction value for making the first reference position and the second reference position coincide with each other based on the first reference position, the second reference position, and the zoom magnification, and performing the lens shift for the second image based on the correction value, in accordance with the selection of the predetermined state.

14. The method according to claim 13, wherein a central position of the first image is the first reference position, and a central position of the second image is the second reference position, and wherein the predetermined state of the zoom is that the lens shift is controlled by the lens driving unit in such a manner that the central position of the first image is not changed when the zoom is performed.

* * * * *